United States Patent
Kimba Dit Adamou et al.

(10) Patent No.: US 11,412,543 B2
(45) Date of Patent: Aug. 9, 2022

(54) METHOD FOR DATA TRANSMISSION, METHOD FOR PARAMETER OPTIMIZATION, APPARATUS, AND DEVICE

(71) Applicant: VIVO MOBILE COMMUNICATION CO., LTD., Guangdong (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/105,983

(22) Filed: Nov. 27, 2020

(65) Prior Publication Data

US 2021/0084682 A1    Mar. 18, 2021

Related U.S. Application Data

(63) Continuation of application No. PCT/CN2019/088505, filed on May 27, 2019.

(30) Foreign Application Priority Data

May 31, 2018 (CN) .......................... 201810549997.4

(51) Int. Cl.
*H04W 74/00* (2009.01)
*H04W 76/18* (2018.01)
(Continued)

(52) U.S. Cl.
CPC ..... *H04W 74/008* (2013.01); *H04W 74/0833* (2013.01); *H04W 76/18* (2018.02); *H04W 76/27* (2018.02)

(58) Field of Classification Search
CPC ... H04W 24/02; H04W 24/10; H04W 74/004; H04W 74/008; H04W 74/0833; H04W 76/18; H04W 76/27
See application file for complete search history.

(56) References Cited

U.S. PATENT DOCUMENTS

2010/0232318 A1    9/2010    Sarkar
2010/0278131 A1    11/2010   Jeong et al.
(Continued)

FOREIGN PATENT DOCUMENTS

CN    101291521 A    10/2008
CN    102143533 A    8/2011
(Continued)

OTHER PUBLICATIONS

Huawei., "UE based measurements for RACH Optimisation," 3GPP TSG-RAN WG3 #64, R3-091109, pp. 1-3, (Apr. 29, 2009).
(Continued)

*Primary Examiner* — Kashif Siddiqui
(74) *Attorney, Agent, or Firm* — Maschoff Brennan

(57) ABSTRACT

A method for data transmission, a method for parameter optimization, an apparatus, and a device are provided. The method for data transmission includes: initiating, by user equipment UE, a random access request or a resource request to a network device; recording, by the UE, random access failure information or resource request failure information; and when detecting that the UE has successfully accessed the network device, sending the random access failure information or the resource request failure information to the network device, so that the network device sends the random access failure information or the resource request failure information to a network management device for parameter optimization processing.

16 Claims, 3 Drawing Sheets

(51) Int. Cl.
*H04W 76/27* (2018.01)
*H04W 74/08* (2009.01)

(56) References Cited

U.S. PATENT DOCUMENTS

| | | | |
|---|---|---|---|
| 2012/0250498 | A1 | 10/2012 | Johansson et al. |
| 2013/0265942 | A1 | 10/2013 | Lu et al. |
| 2014/0133465 | A1 | 5/2014 | Johansson et al. |
| 2014/0241285 | A1 | 8/2014 | Pang et al. |
| 2014/0376374 | A1* | 12/2014 | Moser .............. H04W 24/02 370/235 |
| 2017/0273056 | A1* | 9/2017 | Papasakellariou .. H04W 52/146 |
| 2017/0295511 | A1 | 10/2017 | Sebire et al. |
| 2018/0324716 | A1* | 11/2018 | Jeon ................. H04W 52/367 |
| 2019/0014487 | A1* | 1/2019 | Yang ................... G06N 3/0454 |
| 2019/0141546 | A1* | 5/2019 | Zhou ................ H04W 72/0453 |

FOREIGN PATENT DOCUMENTS

| | | |
|---|---|---|
| CN | 102378380 A | 3/2012 |
| CN | 102860078 A | 1/2013 |
| CN | 103096355 A | 5/2013 |
| CN | 103856980 A | 6/2014 |
| CN | 104823474 A | 8/2015 |
| WO | 2012/071703 A1 | 6/2012 |
| WO | 2017/204934 A1 | 11/2017 |
| WO | 2020/234507 A1 | 11/2020 |

OTHER PUBLICATIONS

Huawei., "Discussion of RACH optimization in NR," 3GPP TSG-RAN3 Meeting #103bis, R3-191589, pp. 1-3, (Apr. 6, 2019).
Extended European Search Report dated Jul. 6, 2021 as received in Application No. 19811455.5.
Catt, UE Measurements and Logs for Mobility Robustness Optimisation, R3-090912, 3GPP TSG-RAN WG3 Meeting #63bis, Seoul, Korea, Mar. 23-26, 2009.
Chinese Search Report issued in corresponding application No. 201810549997.4, dated Mar. 16, 2020.
Chinese Office Action issued in corresponding application No. 201810549997.4, dated Apr. 10, 2020.
International Search Report issued in corresponding application No. PCT/CN2019/088505, dated Dec. 10, 2020.

\* cited by examiner

METHOD FOR DATA TRANSMISSION, METHOD FOR PARAMETER OPTIMIZATION, APPARATUS, AND DEVICE

CROSS-REFERENCE TO RELATED APPLICATIONS

This application is a continuation application of PCT Application No. PCT/CN2019/088505 filed on May 27, 2019, which claims priority to Chinese Patent Application No. 201810549997.4 filed in China on May 31, 2018, which is incorporated herein by reference in its entirety.

TECHNICAL FIELD

This disclosure relates to the field of communications technologies, and in particular, to a method for data transmission, a method for parameter optimization, an apparatus, and a device.

BACKGROUND

In a communications system of the related art, parameter configuration for a random access channel (RACH) directly affects a collision probability, a call setup success rate, and a handover success rate on the channel, and therefore becomes an important factor that affects a call setup delay, an uplink data retransmission delay, and a handover delay. An amount of resources allocated to the RACH also affects a system capacity. Improper RACH configuration may cause a lower preamble detection probability and limited coverage.

Therefore, how to optimize random access parameters or resource configuration parameters of the RACH during random access is a technical problem to be resolved.

SUMMARY

The technical problem to be resolved in embodiments of this disclosure is to provide a method for data transmission and a method for parameter optimization, so as to resolve the problem of the related art that configuration parameters cannot be optimized for a random access failure or resource request failure, resulting in lower random access or resource allocation efficiency.

Correspondingly, the embodiments of this disclosure also provide a data transmission apparatus, a parameter optimization apparatus, and a device, to ensure implementation and application of the foregoing methods.

A first aspect provides a method for data transmission, including:

initiating, by user equipment UE, a random access request or a resource request to a network device;

recording, by the UE, random access failure information or resource request failure information; and when detecting that the UE has successfully accessed the network device, sending, by the UE, the random access failure information or the resource request failure information to the network device, so that the network device sends the random access failure information or the resource request failure information to a network management device for parameter optimization processing.

A second aspect provides a method for parameter optimization, including:

receiving, by a first network device, random access failure information or resource request failure information sent by user equipment UE;

determining, by the first network device, based on the random access failure information or the resource request failure information, whether the first network device is a first network device recorded in the random access failure information or the resource request failure information; and if the first network device is the first network device recorded in the random access failure information or the resource request failure information, reporting, by the first network device, the received random access failure information or resource request failure information to a network management device, so that the network management device performs optimization processing on random access parameters or cell parameters of the resource request.

A third aspect provides a data transmission apparatus, including:

a first sending module, configured to initiate a random access request or a resource request to a network device;

a recording module, configured to record random access failure information or resource request failure information; and a detection module, configured to detect whether the network device is successfully accessed; and a second sending module, configured to: when the detection module detects that the apparatus has successfully accessed the network device, send the random access failure information or the resource request failure information to the network device, so that the network device sends the random access failure information or the resource request failure information to a network management device for parameter optimization processing.

A fourth aspect provides a parameter optimization apparatus, including:

a first receiving module, configured to receive random access failure information or resource request failure information sent by user equipment UE;

a determining module, configured to determine, based on the random access failure information or the resource request failure information, whether the apparatus is an apparatus recorded in the random access failure information or the resource request failure information; and a first sending module, configured to: when the determining module determines that the apparatus is the apparatus recorded in the random access failure information or the resource request failure information, report the received random access failure information or resource request failure information to a network management device for parameter optimization processing.

A fifth aspect provides user equipment, including a memory, a processor, and a computer program stored in the memory and capable of running on the processor, where when the computer program is executed by the processor, the steps of the foregoing method for data transmission are implemented.

A sixth aspect provides a network device, including a memory, a processor, and a computer program stored in the memory and capable of running on the processor, where when the computer program is executed by the processor, the steps of the foregoing method for parameter optimization are implemented.

A seventh aspect provides a computer-readable storage medium. The computer-readable storage medium stores a computer program, and when the computer program is executed by a processor, the steps of the foregoing embodiment of the method for data transmission are implemented, or the steps of the foregoing embodiment of the method for parameter optimization are implemented.

In the embodiments of this disclosure, after failing in initiating random access or the resource request to the network device, the UE records the random access failure information or the resource request failure information, and sends the random access failure information or the resource request failure information to the network device, so that the network device reports the random access failure information or the resource request failure information to the network management device for parameter optimization processing. In other words, with the technical solutions provided in the embodiments of this disclosure, after the random access fails or the resource request fails, the random access failure information or the resource request failure information can be recorded, and the recorded random access failure information or resource request failure information is reported to the network device, so that the network device performs optimization processing on random access parameters or cell parameters of the resource request through the network management device, thereby improving random access or resource allocation efficiency.

It should be understood that the foregoing general descriptions and the following detailed descriptions are merely illustrative and explanative, and do not constitute any limitation on this application.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DETAILED DESCRIPTION

To make the objectives, features and advantages of this disclosure more comprehensible, the following further describes this disclosure in detail with reference to the accompanying drawings and specific implementation manners.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

Figure 1:
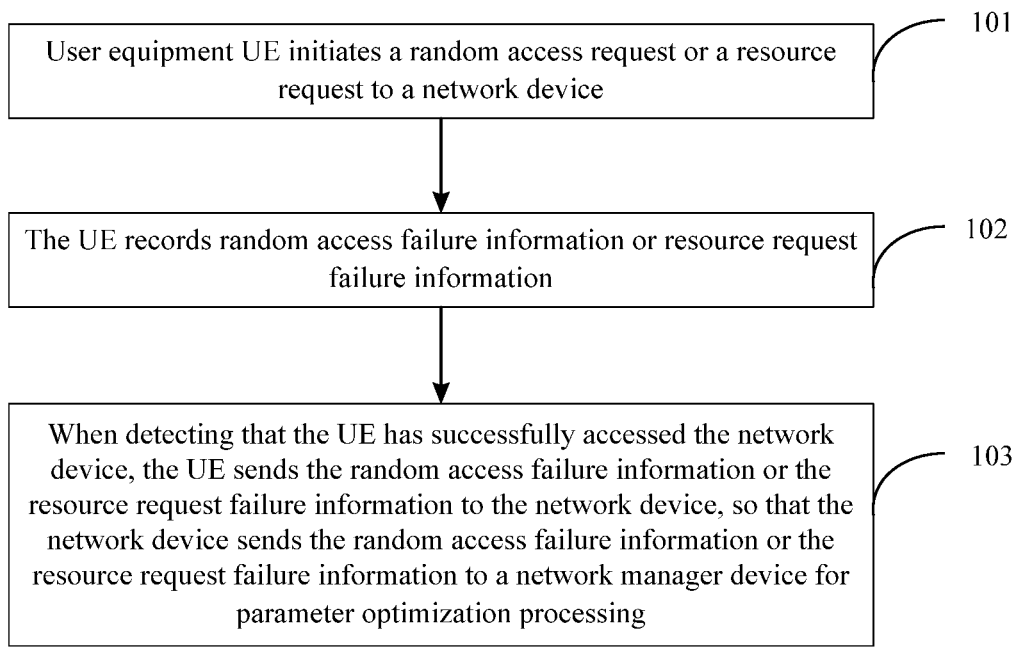
FIG. 1 is a flowchart of a method for data transmission according to an embodiment of this disclosure.

Referring to FIG. 1, FIG. 1 is a flowchart of a method for data transmission according to an embodiment of this disclosure. The following steps may be specifically included.

Step 101: User equipment (UE) initiates a random access request or a resource request to a network device.

In this step, if the UE wants to access a network, the UE needs to initiate a random access request to the network device through a random access channel (RACH). Alternatively, the UE autonomously initiates a resource request, for example, an SI request, to the network device on a network side to request for resource allocation.

The random access request includes a random access type, such as a random access channel for a connection request or/and beam failure recovery or/and a handover process.

The initiating, by user equipment UE, a random access request to a network device specifically includes:

initiating, by the UE, the random access request to the network device through a contention-based random access channel or a contention-free random access channel, where the contention-based random access channel or the contention-free random access channel includes:

a supplementary uplink SUL carrier, a non supplementary uplink SUL carrier, or a bandwidth part BWP.

Step 102: The UE records random access failure information or resource request failure information.

In this step, in the process of initiating a random access process or a resource request, the UE may be successfully connected at a time, or may be successfully connected after several attempts. When the connection fails, connection failure information needs to be recorded. For example, if the random access request fails, at least one of the following needs to be recorded: random-access-related parameters, UE-related parameters, cell signal quality parameters, and a quantity of random access failures, where the random-access-related parameters may include a random access channel type, a process parameter of random access, a cell parameter for a random access failure, and the like, which, however, are not limited thereto. Other parameters may also be recorded based on an actual requirement, and this is not limited in this embodiment. If the resource request fails, the resource request failure information to be recorded includes: current-cell signal quality parameters of the resource request, a quantity of resource request failures, and the like, which, however, are not limited thereto. Other parameters may also be recorded based on an actual requirement, and this is not limited in this embodiment.

Step 103: When detecting that the UE has successfully accessed the network device, the UE sends the random access failure information or the resource request failure information to the network device, so that the network device performs optimization processing on random access parameters based on the random access failure information or performs optimization processing on cell parameters of the resource request based on the resource request failure information.

In this step, the UE finally accesses the network device successfully after one or more connection failures in the following cases:

Case 1: After failing in initiating random access or a resource request to a first network device in a first network, the UE continues to initiate a random access request or a resource request to the first network device in the first network until connection succeeds. In other words, the UE initiates the random access request or the resource request to the same network device in the same network for one or more times until connection succeeds.

Case 2: After failing in initiating random access or a resource request to a first network device in a first network, the UE initiates a random access request or a resource request to a second network device in the first network until connection succeeds. In other words, after the UE initiates a random access request or a resource request to one network device in the network, and the request fails, the UE continues to initiate a random access request or a resource request to another network device in the network until connection succeeds.

Case 3: After failing in initiating random access or a resource request to a first network device in a first network, the UE initiates a random access request or a resource request to a first network device in a second network until connection succeeds. In other words, after the UE initiates a random access request or a resource request to one network device in the network, and the request fails, the UE may initiate a random access request or a resource request to a network device in another network until connection succeeds. It should be noted that a process in which the UE initiates the random access request or the resource request to the network device in the another network is similar to the foregoing process. For a specific process, refer to the foregoing description, and details are not described herein again.

Then, when detecting that the UE has successfully accessed the network device, the UE sends the random access failure information or the resource request failure information to the network device, so that the network device sends the random access failure information or the resource request failure information to a network management device for parameter optimization processing. For example, the network management device (which is a collection and recording network element or the like) adjusts RACH-related parameters or improves a RACH access capacity of a cell based on random-access-related parameters and/or UE-related parameters and/or cell signal quality parameters that are reported by the UE. Alternatively, the network device adjusts SI-request-related parameters based on the cell signal quality parameters (for example, current-cell signal quality parameters of the resource request) reported by the UE.

In this embodiment of this disclosure, after failing in initiating random access or the resource request to the network device, the UE records the random access failure information or the resource request failure information, and sends the random access failure information or the resource request failure information to the network device, so that the network device reports the random access failure information or the resource request failure information to the network management device for parameter optimization processing. In other words, with the technical solution provided in this embodiment of this disclosure, after the random access fails or the resource request fails, the random access failure information or the resource request failure information can be recorded, and the recorded random access failure information or resource request failure information is reported to the network device, so that the network device performs optimization processing on random access parameters or cell parameters of the resource request through the network management device in a timely manner, thereby improving random access or resource allocation efficiency.

Optionally, in another embodiment, on the basis of the foregoing embodiment, when it is detected that the UE has successfully accessed the network device, the method may further include:

(1) The UE requests the network device to indicate whether to send the recorded random access failure information or resource request failure information.

In this step, when the UE has successfully accessed the network device, the UE requests the accessed network device for whether to send the random access failure information or the resource request failure information that is recorded and stored. After receiving the request, the network device determines whether to agree with. If necessary, the network device sends, to the UE, an indication that the network device agrees with sending the random access failure information or the resource request failure information; otherwise, the network device sends a disagreement indication to the UE.

(2) Receive the indication that the network device agrees with sending the random access failure information or the resource request failure information.

In this step, if the network device sends a sending agreement indication to the UE, the UE receives the agreement indication sent by the network device.

(3) According to the indication, perform the step of sending the random access failure information or the resource request failure information to the network device by the UE.

In this step, after receiving the sending agreement indication, the UE sends the random access failure information or the resource request failure information to the network device.

In one embodiment, the UE may send the random access failure information or the resource request failure information to the network device by using a radio resource control message or dedicated signaling.

In this embodiment of this disclosure, when the UE has successfully accessed the network, the UE requests the network device to indicate whether to send the recorded random access failure information or resource request failure information, and after receiving the sending agreement indication sent by the network device, sends the random access failure information or the resource request failure information to the network device. To be specific, this embodiment differs from the foregoing embodiment in that after the UE has successfully accessed the network, the UE does not send the recorded random access failure information or resource request failure information to the accessed network device in a timely manner, but requests (or indicates to) the network device for whether the random access failure information or the resource request failure information needs to be sent, and after receiving the sending agreement indication sent by the network device, sends the recorded random access failure information or resource request failure information to the network device, so that the network device reports the recorded random access failure information or resource request failure information to the network management device for parameter optimization processing. In other words, with the technical solution provided in this embodiment of this disclosure, after the random access fails or the resource request fails, the random access failure information or the resource request failure information can be recorded, and the recorded random access failure information or resource request failure information is reported to the network device, so that the network device performs optimization processing on random access parameters or cell parameters of the resource request through the network management device, thereby improving random access or resource allocation efficiency.

Figure 2:
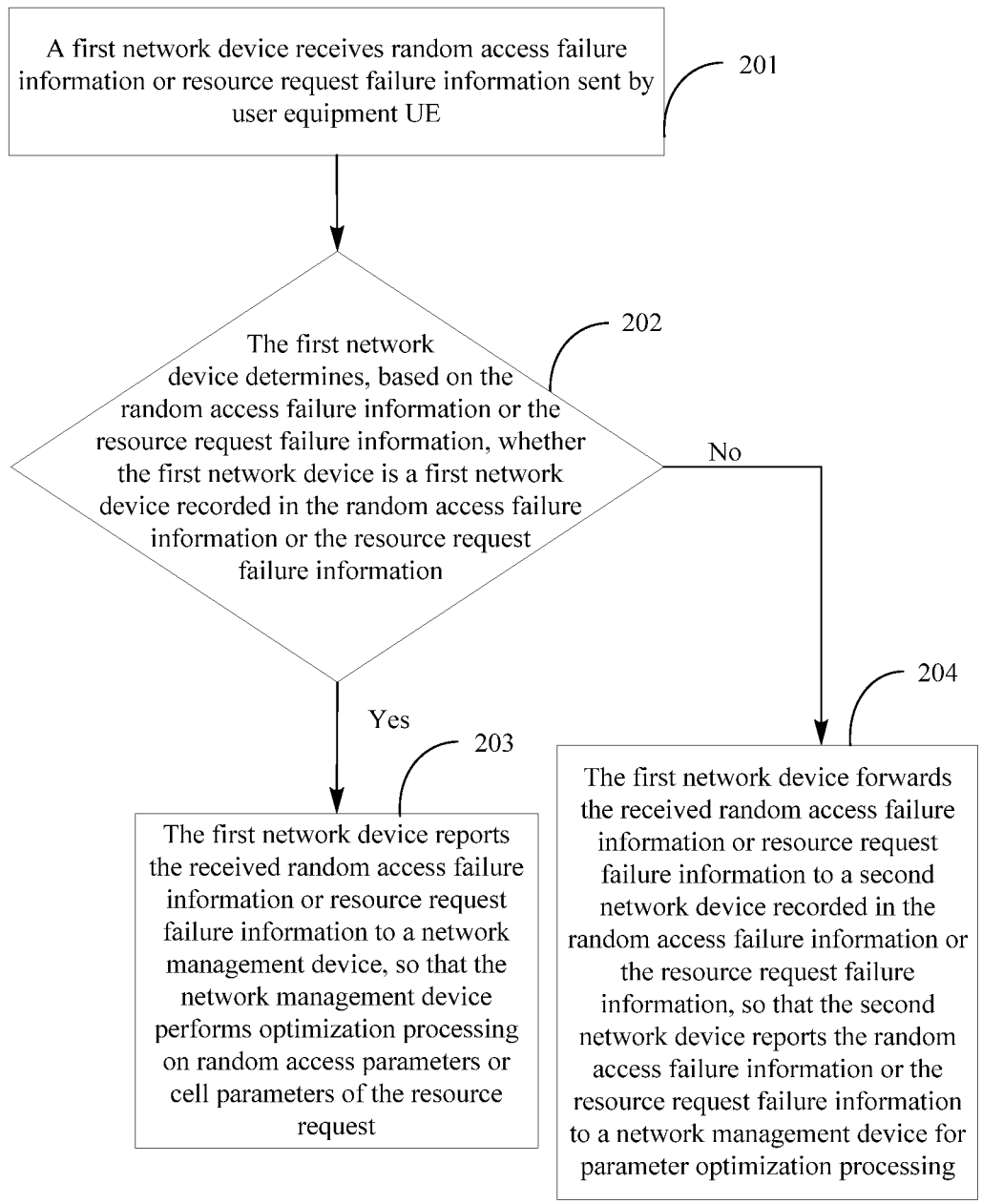
FIG. 2 is a flowchart of a method for parameter optimization according to an embodiment of this disclosure.

Referring to FIG. 2, FIG. 2 is a flowchart of a method for parameter optimization according to an embodiment of this disclosure. The method includes the following steps.

Step 201: A first network device receives random access failure information or resource request failure information sent by user equipment UE.

In this step, when the UE has successfully accessed a network, the UE sends the recorded random access failure information or resource request failure information to the first network device in the accessed network.

The random access failure information includes at least one of the following: random-access-related parameters, UE-related parameters, cell signal quality parameters, and a quantity of random access failures. The random-access-related parameters include: a random access channel type, a process parameter of random access, a cell parameter for a random access failure, and the like.

The resource request failure information includes: current-cell parameters of the resource request and a quantity of resource request failures.

Step 202: The first network device determines, based on the random access failure information or the resource request failure information, whether the first network device is a first network device recorded in the random access failure information or the resource request failure information. If yes, step 203 is performed; if not, the process is ended.

In this step, the first network device determines, based on an identifier in the received random access failure information or resource request failure information, whether the first network device is a network device in the random access failure or the resource request failure of the UE. If yes, step 203 is performed; if not, step 204 may be further performed.

Step 203: The first network device reports the received random access failure information or resource request failure information to a network management device, so that the network management device performs optimization processing on random access parameters or cell parameters of the resource request.

Step 204: The first network device forwards the received random access failure information or resource request failure information to a second network device recorded in the random access failure information or the resource request failure information, so that the second network device reports the random access failure information or the resource request failure information to the network management device for parameter optimization processing.

That is, if the first network device determines, based on the identifier in the received random access failure information or resource request failure information, that the first network device is not a network device in the random access failure or the resource request failure of the UE, the first network device forwards the received random access failure information or resource request failure information to the second network device recorded in the random access failure information or the resource request failure information, so that the second network device reports the random access failure information or the resource request failure information to the network management device for parameter optimization processing.

For example, the network management device (which is a collection and recording network element or the like) adjusts RACH-related parameters or improves a RACH access capacity of a cell based on random-access-related parameters and/or UE-related parameters and/or cell signal quality parameters that are reported by the UE. Alternatively, the network management device adjusts SI-request-related parameters based on the cell signal quality parameters that are reported by the UE.

Optionally, in another embodiment, on the basis of the foregoing embodiment, before the first network device receives the random access failure information or the resource request failure information sent by the UE, the method may further include:

receiving, by the first network device from the UE, a request for an indication of whether to send the recorded random access failure information or resource request failure information; and sending, by the first network device to the UE, an indication that the first network device agrees with sending the random access failure information or the resource request failure information.

That is, in this embodiment, after the UE is successfully connected to the network device, before sending the recorded random access failure information or resource request failure information to the network device, the UE first asks the network device connected to the UE whether the network device agrees with sending. If the network device agrees, the network device sends a sending agreement indication to the UE; if the network device does not agree, the network device sends a disagreement indication to the UE. The UE determines, according to the received indication, whether to send, to the network device, the random access failure information or the resource request failure information recorded when the connection fails.

In this embodiment of this disclosure, when the UE is connected successfully, the network device receives the random access failure information or the resource request failure information sent by the UE, and determines, based on an identifier in the information, whether the network device is a network device in the random access failure or resource request failure. If yes, the network device directly sends the random access failure information or the resource request failure information to the network management device, so that the network management device performs optimization processing on the random access parameters or the cell parameters of the resource request; if not, the network device forwards the received random access failure information or resource request failure information to the second network device recorded in the random access failure information or the resource request failure information, so that the second network device reports the random access failure information or the resource request failure information to the network device for parameter optimization processing. In other words, with the technical solution provided in this embodiment of this disclosure, after the random access fails or the resource request fails, the random access failure information or the resource request failure information can be recorded, and the recorded random access failure information or resource request failure information is reported to the network device, so that the network device performs optimization processing on random access parameters or cell parameters of the resource request through the network management device, thereby improving random access or resource allocation efficiency.

For ease of understanding of this disclosure, refer to example 1 and example 2 below.

Example 1

In example 1, that the UE initiates a random access request to the network device is used as an example.

1. The UE sends the random access request to the network device.

In this step, the random access request may include a UE-initiated random access type, such as a RACH for a connection request or/and beam failure recovery or/and a handover process, specifically including:

(1) Contention-free random access channel (Contention free RACH), including:

Non supplementary uplink (SUL) carrier or bandwidth part random access channel (BWPRACH).

SUL carrier or BWPRACH: The UE may initiate a RACH on different links.

(2) Contention-based random access channel (Contention based RACH), including:

Non SUL carrier or BWP RACH.

SUL carrier or BWPRACH: The UE may initiate a RACH on different links.

2. The UE records the random access failure information.

That is, when random access fails, the UE records and stores the random access failure information, where the random access failure information may include, but is not limited to:

(1) UE-related parameters, which may include:
preamble transmission count (PREAMBLE_TRANSMISSION_COUNTER);
preamble power ramping count (PREAMBLE_POWER_RAMPING_COUNTER);
preamble received target power (PREAMBLE_RECEIVED_TARGET_POWER);
DELTA_PREAMBLE;
preamble index (PREAMBLE_INDEX);
preamble backoff (PREAMBLE_BACKOFF);
PCMAX;
temporary C-RNTI (TEMPORARY_C-RNTI); and
RAPID.

(2) Random-access-related parameters, where the random-access-related parameters may further include: a RACH type, a process parameter of random access, and a cell parameter for a random access failure.

(211) RACH type (212) RACH process related parameters, which may include:
physical random access channel configuration index (prach-ConfigIndex);
preamble received target power (preambleReceivedTargetPower);
rsrp-Threshold SSBcsirs-Threshold;
sul-RSRP-Threshold: threshold used for selecting a NUL carrier or a SUL carrier;
preamble power ramping step (preamblePowerRampingStep);
ra-PreambleIndex;
ra-ssb-OccasionMaskIndex;
preambleTxMax;
ssb-perRACH-OccasionAndCB-PreamblesPerSSB;
numberOfRA-PreamblesGroupA;
ra-Msg3SizeGroupA;
deltaPreambleMsg3;
messagePowerOffsetGroupB;
set of random access preambles and/or PRACH occasions for SI request (Set of Random Access Preambles and/or PRACH occasions for SI request);
set of random access preambles and/or PRACH occasions for beam failure recovery request (Set of Random Access Preambles and/or PRACH occasions for beam failure recovery request);
ra-ResponseWindow;
ra-ContentionResolutionTimer; and
PCMAX,f,c.

(213) Process related parameters of a current RACH failed cell, which may include:
unique identifier ID of the current cell;
unique identifier ID and network type of the current cell, for example, LTE cell 1;
PLMN list;
TAC;
RANAC;
location information;
current-cell signal quality, including:
reference signal received power (RSRP);
LTE reference signal received quality (RSRQ);
signal to interference plus noise ratio (SINR);
beam related information, including synchronization signal block SSB/primary synchronization signal PSS/secondary synchronization signal SSS;
bandwidth part (BWP) information, including BWP ID;
BSSI;
RSS;
Power Headroom (PH): power headroom;
RSRP/RSRQ/SINR of SS block, and PSS, SSS, and related physical broadcast channel (PBCH) of SS block;
measures of PSS and SSS, which may include a beam time index;
measures of PBCH may include demodulation reference signal (DMRS) measures and related beam information;
RSRP/RSRQ/SINR measures of CSI-RS; and
tracking reference signal (TRS)/phase-tracking reference signal (PTRS) measures information.

(3) Quantity of random access failures

3. When detecting that the UE has successfully accessed the network device, the UE sends the random access failure information to the network device, so that the network device sends the random access failure information to the network management device for parameter optimization processing.

In this step, when it is detected that the UE has been successfully connected to the network, a specific connection process includes the following cases:

Case 1: If the UE fails in RACH to a network device 1 of a network 1, the UE continues to connect to the network device 1 of the network 1 after the RACH failure, until being successfully connected to the network device 1 of the network 1.

Case 2: If the UE fails in RACH to a network device 1 of a network 1, the UE is successfully connected to a network device 2 of the network 1 after the RACH failure.

Case 3: If the UE fails in RACH to a network device 1 of a network 1, the UE is successfully connected to a network device 1 of a network 2 after the RACH failure.

After that, the UE sends the random access failure information to the successfully connected network device, regardless of in which of the foregoing cases the UE is successfully connected.

Further, after being successfully connected, the UE may first request the network device to indicate whether to send the recorded random access failure information. Specifically, the UE may send the random access failure information to the network device by using a radio resource control RRC message or dedicated signaling. The RRC message is, for example, an MSG1/3/5. If an agreement indication sent by the network device is received, the random access failure information is sent to the network device.

For example, if the UE once fails in RRC connection in LTE, the UE may report to LTE or may report to a communications network such as 5G or WLAN or 3G.

4. The network device receives the random access failure information sent by the user equipment UE.

In one case, the network device directly receives the random access failure information sent by the UE.

In another case, the network device first receives the indication requesting for sending the random access failure information and sent by the UE, and after sending the sending agreement indication to the UE, receives the random access failure information sent by the UE.

That the network device sends the sending agreement indication to the UE may be implemented in the following manner:

The agreement indication information may be included in an existing RRC message, such as an MSG2/4/6, and certainly, may also be included in an RRC reconfiguration message, an RRC suspend message, an RRC release message medium, or the like, or may be used by the network to instruct the UE by using dedicated signaling to upload the recorded random access failure information.

5. The network device determines, based on the random access failure information, whether the network device is a network device recorded in the random access failure information.

In this step, the random access failure information may further include an identifier of a cell or network device of the random access failure, so that a network device receiving the random access failure message determines whether the network device is a network device recorded in the random access failure information.

6. The network device reports the received random access failure information to the network management device (which is a collection and recording network element), so that the network management device performs optimization processing on the random access parameters.

7. Based on the RACH related parameters and/or UE-related parameters and/or cell signal quality parameters reported by the UE, the network management device adjusts the RACH related parameters or improves the RACH access capacity of the cell.

Example 2

In example 2, that the UE initiates a resource request to the network device is used as an example.

1. The UE sends the resource request to the network device.

In this step, when the UE autonomously initiates the resource request, for example, an SI request, to the network, the UE initiates a timer T.

2. The UE records the resource request failure information.

That is, when the UE receives no response from the network (that is, the request fails) upon timeout of T, the UE records current-cell-related parameters, which may include:

unique identifier ID of the current cell;
unique identifier ID and network type of the current cell, for example, LTE cell 1;
PLMN list;
TAC;
RANAC;
location information;
current-cell signal quality, which may include:
RSRP;
RSRQ;
SINR;
beam related information, including SSB/PSS/SSS;
BWP information, including BWP ID;
BSSI;
RSS;
Power Headroom (PH);
RSRP/RSRQ/SINR of SS block, and PSS, SSS, and related PBCH of SS block;
measures of PSS and SSS, which may include a beam time index.
measures of PBCH, which may include DMRS measures and related beam information;
RSRP/RSRQ/SINR measures of CSI-RS; and
measures information of TRS (Tracking RS)/PTRS (Phase-tracking RS).

(3) Quantity of resource request failures

3. When detecting that the UE has successfully accessed the network device, the UE sends the resource request failure information to the network device, so that the network device sends the resource request failure information to the network management device for parameter optimization processing.

In this step, when the UE is in a connected or inactive state or when the UE is being connected to the network, a specific connection process includes the following cases:

Case 1: If the UE fails in RACH to a network device 1 of a network 1, the UE continues to connect to the network device 1 of the network 1 after the RACH failure, until being successfully connected to the network device 1 of the network 1.

Case 2: If the UE fails in RACH to a network device 1 of a network 1, the UE is successfully connected to a network device 2 of the network 1 after the RACH failure.

Case 3: If the UE fails in RACH to a network device 1 of a network 1, the UE is successfully connected to a network device 1 of a network 2 after the RACH failure.

Then, the UE sends the resource request failure information to the successfully connected network device, regardless of in which of the foregoing cases the UE is successfully connected.

Further, after being successfully connected, the UE may first request the network device to indicate whether to send the recorded resource request failure information. Specifically, the UE may send the resource request failure information to the network device by using a radio resource control RRC message or dedicated signaling. The RRC message is, for example, an MSG1/3/5. If a sending agreement indication sent by the network device is received, the resource request failure information is sent to the network device.

For example, if the UE once fails in RRC connection in LTE, the UE may report to LTE or may report to a communications network such as 5G or WLAN or 3G.

4. The network device receives the resource request failure information sent by the user equipment UE.

In one case, the network device directly receives the resource request failure information sent by the UE.

In another case, the network device first receives the indication requesting for sending the resource request failure information sent by the UE, and after sending the sending agreement indication to the UE, receives the resource request failure information sent by the UE.

That the network device sends the sending agreement indication to the UE may be implemented in the following manner:

The agreement indication information may be included in an existing RRC message, such as an MSG2/4/6, and certainly, may also be included in an RRC reconfiguration message, an RRC suspend message, an RRC release message medium, or the like, and certainly may be used by the network to instruct the UE by using dedicated signaling to upload the recorded resource request failure information.

5. The network device determines, based on the resource request failure information, whether the network device is a network device recorded in the resource request failure information.

In this step, the resource request failure information may further include an identifier of a cell or network device of the resource request failure, so that a network device receiving the resource request failure message determines whether the network device is a network device recorded in the resource request failure information.

6. The network device reports the received resource request failure information to the network management device (which is a collection and recording network element), so that the network management device performs optimization processing on the cell parameters of the resource request.

7. The network management device adjusts SI-request-related parameters based on the cell signal quality parameters reported by the UE.

It should be noted that this embodiment merely uses the foregoing two cases as examples, which is not limited thereto in actual application.

It should be noted that, for ease of description, the method embodiments are described as a combination of a series of actions; however, persons skilled in the art should know that the embodiments of this disclosure are not limited by the described action sequence, because some steps may be performed in another sequence or simultaneously according to the embodiments of this disclosure. In addition, it should also be understood by a person skilled in the art that the embodiments described in this specification are all optional embodiments, and the related actions may not be mandatory to the embodiments of this disclosure.

Figure 3:
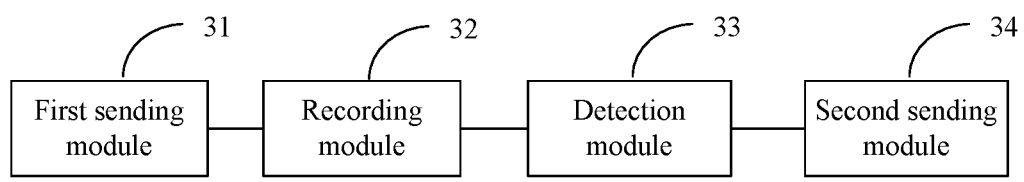
FIG. 3 is a schematic structural diagram of a data transmission apparatus according to an embodiment of this disclosure.

Referring to FIG. 3, FIG. 3 is a schematic structural diagram of a data transmission apparatus according to an embodiment of this disclosure. The apparatus specifically includes: a first sending module 31, a recording module 32, a detection module 33, and a second sending module 34.

The first sending module 31 is configured to initiate a random access request or a resource request to a network device.

The recording module 32 is configured to record random access failure information or resource request failure information.

The detection module 33 is configured to detect whether the network device is successfully accessed.

The second sending module 34 is configured to: when the detection module 33 detects that the apparatus has successfully accessed the network device, send the random access failure information or the resource request failure information to the network device, so that the network device sends the random access failure information or the resource request failure information to a network management device for parameter optimization processing.

Optionally, the apparatus further includes: a request module and a first receiving module.

The request module is configured to: when the detection module detects that the apparatus has successfully accessed the network device, request the network device for an indication of whether to send the recorded random access failure information or resource request failure information.

The first receiving module is configured to receive an indication that the network device agrees with sending the random access failure information or the resource request failure information.

The second sending module is further configured to: when the detection module detects that the apparatus has successfully accessed the network device, send the random access failure information or the resource request failure information to the network device according to the indication.

Optionally, the second sending module is specifically configured to: when the detection module detects that the apparatus has successfully accessed the network device, send the random access failure information or the resource request failure information to the network device by using a radio resource control message or dedicated signaling.

Optionally, in another embodiment, on the basis of the foregoing embodiment, this embodiment may further include:

a first initiation module, configured to: after the first sending module fails in initiating random access or a resource request to a first network device in a first network, continue to initiate a random access request or a resource request to the first network device in the first network until connection succeeds; or a second initiation module, configured to: after the first sending module fails in initiating random access or a resource request to a first network device in a first network, initiate a random access request or a resource request to a second network device in the first network until connection succeeds; or a third initiation module, configured to: after the first sending module fails in initiating random access or a resource request to a first network device in a first network, initiate a random access request or a resource request to a first network device in a second network until connection succeeds.

Optionally, in another embodiment, on the basis of the foregoing embodiment, the random access failure information recorded by the recording module includes at least one of the following: a random-access-related parameter, a UE-related parameter, a cell signal quality parameter, and a quantity of random access failures; and the resource request failure information recorded includes: current-cell parameters of the resource request and a quantity of resource request failures.

Optionally, in another embodiment, on the basis of the foregoing embodiment, that the first sending module initiates the random access request to the network device includes: initiating the random access request to the network device through a contention-based random access channel or a contention-free random access channel, where the contention-based random access channel or the contention-free random access channel includes: a supplementary uplink SUL carrier, a non-supplementary uplink SUL carrier, or a bandwidth part BWP.

Figure 4:
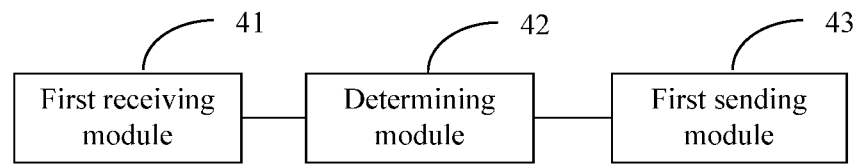
FIG. 4 is a schematic structural diagram of a parameter optimization apparatus according to an embodiment of this disclosure.

Further referring to FIG. 4, FIG. 4 is a parameter optimization apparatus according to an embodiment of this disclosure. The apparatus includes: a first receiving module 41, a determining module 42, and a first sending module 43.

The first receiving module 41 is configured to receive random access failure information or resource request failure information sent by user equipment UE.

The determining module 42 is configured to determine, based on the random access failure information or the resource request failure information, whether the apparatus is an apparatus recorded in the random access failure information or the resource request failure information.

The first sending module 43 is configured to: when the determining module 42 determines that the apparatus is the apparatus recorded in the random access failure information or the resource request failure information, report the received random access failure information or resource request failure information to a network management device for parameter optimization processing.

Optionally, in another embodiment, on the basis of the foregoing embodiment, the apparatus may further include a forwarding module.

The forwarding module is configured to: when the determining module determines that the apparatus is not the apparatus recorded in the random access failure information or the resource request failure information, forward the received random access failure information or resource request failure information to a network device recorded in the random access failure information or the resource request failure information, so that the network device reports the random access failure information or the resource request failure information to the network management device for parameter optimization processing.

Optionally, in another embodiment, on the basis of the foregoing embodiment, before receiving the random access failure information or the resource request failure information sent by the UE, the apparatus may further include: a second receiving module and a second sending module.

The second receiving module is configured to: before the first receiving module receives the random access failure information or the resource request failure information sent by the UE, receive a request, from the UE, for an indication of whether to send the recorded random access failure information or resource request failure information.

The second sending module is configured to send, to the UE, an indication of agreeing with sending the random access failure information or the resource request failure information.

The apparatus embodiment is essentially similar to the method embodiment, and therefore is described briefly. For related information, refer to descriptions of the related parts in the method embodiment.

In this embodiment of this disclosure, after failing in initiating random access or the resource request to the network device, the UE records the random access failure information or the resource request failure information, and sends the random access failure information or the resource request failure information to the network device, so that the network device reports the random access failure information or the resource request failure information to the network management device for parameter optimization processing. In other words, with the technical solution provided in this embodiment of this disclosure, after the random access fails or the resource request fails, the random access failure information or the resource request failure information can be recorded, and the recorded random access failure information or resource request failure information is reported to the network device, so that the network device performs optimization processing on random access parameters or cell parameters of the resource request through the network management device, thereby improving random access or resource allocation efficiency.

All embodiments in this specification are described in a progressive manner. Each embodiment focuses on differences from other embodiments. For the part that is the same or similar between different embodiments, reference may be made between the embodiments.

Optionally, an embodiment of this disclosure further provides user equipment, including a memory, a processor, and a computer program stored in the memory and capable of running on the processor. When the computer program is executed by the processor, the processes of the foregoing embodiment of the method for data transmission are implemented, with the same technical effects achieved. To avoid repetition, details are not described herein again.

Optionally, an embodiment of this disclosure further provides a network device, including a processor, a memory, and a computer program stored in the memory and capable of running on the processor. When the computer program is executed by the processor, the processes of the foregoing embodiment of the method for parameter optimization are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the foregoing embodiment of the method for data transmission or the foregoing embodiment of the method for parameter optimization are implemented, with the same technical effects achieved. To avoid repetition, details are not described herein again. The computer-readable storage medium is, for example, a read-only memory (ROM), a random access memory (RAM), a magnetic disk, an optical disc, or the like.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, in the embodiments of this disclosure, a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the terminal device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing terminal device to generate a machine, so that the instructions executed by a computer or a processor of any other programmable data processing terminal device generate an apparatus for implementing a specific function in one or more processes in the flowcharts and/or in one or more blocks in the block diagrams.

These computer program instructions may be stored in a computer-readable memory that can instruct the computer or any other programmable data processing terminal device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or other programmable data processing terminal device, so that a series of operations and steps are performed on the computer or the other programmable terminal device, thereby generating computer-implemented processing. Therefore, the instructions executed on the computer or the other programmable terminal devices provide steps for implementing a specific function in one or more processes in the flowcharts and/or in one or more blocks in the block diagrams.

Although some optional embodiments in the embodiments of this disclosure have been described, persons skilled in the art can make changes and modifications to these embodiments once they learn the basic inventive concept. Therefore, the following claims are intended to be construed as to cover the optional embodiments and all changes and modifications falling within the scope of the embodiments of this disclosure.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include", "comprise", or any of their variants are intended to cover a non-exclusive inclusion, such that a process, a method, an article, or terminal device that includes a list of elements not only includes those elements but also includes other elements that are not expressly listed, or further includes elements inherent to such a process, method, article, or terminal device. In absence of more constraints, an element preceded by "includes a . . . " does not preclude the existence of other identical elements in the process, method, article, or terminal device that includes the element.

The method for data transmission, the method for parameter optimization, the apparatus, and the device provided in this disclosure are described in detail above. The principle and the implementations of this disclosure are described in this specification by using specific examples. The descriptions about the embodiments are merely provided to help understand the method and the core idea of this disclosure. In addition, a person of ordinary skill in the art can make changes to the specific implementations and the application scope according to the idea of this disclosure. Therefore, the content of this specification shall not be construed as a limitation on this disclosure.

What is claimed is:

1. A method for data transmission, comprising:
    initiating, by user equipment UE, a random access request or a resource request to a network device;
    recording, by the UE, random access failure information or resource request failure information; and
    when detecting that the UE has successfully accessed the network device, sending, by the UE, the random access failure information or the resource request failure information to the network device, so that the network device sends the random access failure information or the resource request failure information to a network management device for parameter optimization processing;
    wherein when it is detected that the UE has successfully accessed the network device, the method further comprises:
    requesting, by the UE, the network device to indicate whether to send the recorded random access failure information or resource request failure information;
    receiving, by the UE, an indication that the network device agrees with sending the random access failure information or the resource request failure information; and
    performing, by the UE according to the indication, the step of sending the random access failure information or the resource request failure information to the network device by the UE.

2. The method according to claim 1, wherein the sending, by the UE, the random access failure information or the resource request failure information to the network device specifically comprises:
    sending, by the UE, the random access failure information or the resource request failure information to the network device by using a radio resource control message or dedicated signaling.

3. The method according to claim 1, wherein that the UE has successfully accessed the network device specifically comprises:
    after failing in initiating random access or a resource request to a first network device in a first network, continuing, by the UE, to initiate a random access request or a resource request to the first network device in the first network until connection succeeds; or
    after failing in initiating random access or a resource request to a first network device in a first network, initiating, by the UE, a random access request or a resource request to a second network device in the first network until connection succeeds; or
    after failing in initiating random access or a resource request to a first network device in a first network, initiating, by the UE, a random access request or a resource request to a first network device in a second network until connection succeeds.

4. The method according to claim 1, wherein the initiating, by user equipment UE, a random access request to a network device specifically comprises:
    initiating, by the UE, the random access request to the network device through a contention-based random access channel or a contention-free random access channel, wherein the contention-based random access channel or the contention-free random access channel comprises:
    a supplementary uplink SUL carrier, a non supplementary uplink SUL carrier, or a bandwidth part BWP.

5. The method according to claim 1, wherein the random access failure information comprises at least one of the following: random-access-related parameters, UE-related parameters, cell signal quality parameters, and a quantity of random access failures; and
    the resource request failure information comprises: current-cell signal quality parameters of the resource request and a quantity of resource request failures.

6. A method for parameter optimization, comprising:
    receiving, by a first network device, random access failure information or resource request failure information sent by user equipment UE;
    determining, by the first network device, based on the random access failure information or the resource request failure information, whether the first network device is a first network device recorded in the random access failure information or the resource request failure information; and
    if the first network device is the first network device recorded in the random access failure information or the resource request failure information, reporting, by the first network device, the received random access failure information or resource request failure information to a network management device, so that the network management device performs optimization processing on random access parameters or cell parameters of the resource request.

7. The method according to claim 6, further comprising:
    if the first network device is not the first network device recorded in the random access failure information or the resource request failure information, forwarding, by the first network device, the received random access failure information or resource request failure information to a second network device recorded in the random access failure information or the resource request failure information, so that the second network device reports the random access failure information or the resource request failure information to the network management device for parameter optimization processing.

8. The method according to claim 6, wherein before the receiving, by a first network device, random access failure information or resource request failure information sent by UE, the method further comprises:
receiving, by the first network device from the UE, a request for an indication of whether to send the recorded random access failure information or resource request failure information; and
sending, by the first network device to the UE, an indication that the first network device agrees with sending the random access failure information or the resource request failure information.

9. A data transmission apparatus, comprising: a memory, a processor, and a computer program stored in the memory and capable of running on the processor, wherein the processor executes the computer program to:
initiate a random access request or a resource request to a network device;
record random access failure information or resource request failure information;
detect whether the network device is successfully accessed; and
when it is detected that the apparatus has successfully accessed the network device, send the random access failure information or the resource request failure information to the network device, so that the network device sends the random access failure information or the resource request failure information to a network management device for parameter optimization processing;
wherein the processor executes the computer program to:
when it is detected that the apparatus has successfully accessed the network device, request the network device for an indication of whether to send the recorded random access failure information or resource request failure information; and
receive an indication that the network device agrees with sending the random access failure information or the resource request failure information; wherein
wherein the processor executes the computer program to:
when it is detected that the apparatus has successfully accessed the network device, send the random access failure information or the resource request failure information to the network device according to the indication.

10. The apparatus according to claim 9, wherein the processor executes the computer program to send the random access failure information or the resource request failure information to the network device by using a radio resource control message or dedicated signaling when it is detected that the apparatus has successfully accessed the network device.

11. The apparatus according to claim 9, wherein the processor executes the computer program to:
after an initiating of a random access or a resource request to a first network device in a first network is failed, continue to initiate a random access request or a resource request to the first network device in the first network until connection succeeds; or
after an initiating of a random access or a resource request to a first network device in a first network is failed, initiate a random access request or a resource request to a second network device in the first network until connection succeeds; or
after an initiating of a random access or a resource request to a first network device in a first network is failed, initiate a random access request or a resource request to a first network device in a second network until connection succeeds.

12. The apparatus according to claim 9, wherein the processor executes the computer program to initiate the random access request to the network device through a contention-based random access channel or a contention-free random access channel, wherein the contention-based random access channel or the contention-free random access channel comprises:
a supplementary uplink SUL carrier, a non supplementary uplink SUL carrier, or a bandwidth part BWP.

13. The apparatus according to claim 9, wherein
the random access failure information comprises at least one of the following: random-access-related parameters, UE-related parameters, cell signal quality parameters, and a quantity of random access failures; and the resource request failure information recorded comprises: current-cell parameters of the resource request and a quantity of resource request failures.

14. A parameter optimization apparatus, comprising: a memory, a processor, and a computer program stored in the memory and capable of running on the processor, wherein the processor executes the computer program to perform the method for parameter optimization according to claim 6.

15. A non-transitory computer-readable storage medium, storing a computer program, wherein when the computer program is executed by a processor, the steps of the method for data transmission according to claim 1 are implemented.

16. A non-transitory computer-readable storage medium, storing a computer program, wherein when the computer program is executed by a processor, the steps of the method for parameter optimization according to claim 6 are implemented.

* * * * *